United States Patent
Okamoto et al.

(10) Patent No.: US 7,916,320 B2
(45) Date of Patent: Mar. 29, 2011

(54) IMAGE PROCESSING APPARATUS FOR ADDING DIFFERENT SPECIFIC IMAGES TO IMAGE DATA IN COLOR AND BLACK-AND-WHITE MODES

(75) Inventors: Yuji Okamoto, Kyoto (JP); Shuhji Fujii, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 649 days.

(21) Appl. No.: 11/999,601

(22) Filed: Dec. 6, 2007

(65) Prior Publication Data
US 2008/0212114 A1 Sep. 4, 2008

(30) Foreign Application Priority Data
Dec. 7, 2006 (JP) .................................. 2006-330090

(51) Int. Cl.
*G06K 15/00* (2006.01)
(52) U.S. Cl. .................... 358/1.14; 358/1.13; 358/1.15; 358/1.9
(58) Field of Classification Search ............... 358/1.14, 358/3.28, 1.1, 1.9; 379/68; 399/366; 382/100
See application file for complete search history.

(56) References Cited

U.S. PATENT DOCUMENTS

| | | | | |
|---|---|---|---|---|
| 5,168,147 | A * | 12/1992 | Bloomberg | 235/456 |
| 6,970,259 | B1 * | 11/2005 | Lunt et al. | 358/1.14 |
| 7,168,868 | B2 * | 1/2007 | Uchida et al. | 400/62 |
| 7,227,661 | B2 * | 6/2007 | Matsunoshita | 358/1.15 |
| 7,599,078 | B2 * | 10/2009 | Sano | 358/1.13 |
| 2006/0222380 | A1 * | 10/2006 | Shimazawa et al. | 399/18 |

FOREIGN PATENT DOCUMENTS

| | | |
|---|---|---|
| JP | 2001-045271 | 2/2001 |
| JP | 2002-109542 | 4/2002 |
| JP | 2004-194354 | 7/2004 |
| JP | 2006-178048 | 7/2006 |
| JP | 2006-287868 | 10/2006 |

* cited by examiner

*Primary Examiner* — King Y Poon
*Assistant Examiner* — Christopher D Wait
(74) *Attorney, Agent, or Firm* — David G. Conlin; Steven M. Jensen; Edwards Angell Palmer & Dodge LLP

(57) ABSTRACT

An image processing apparatus for preventing unauthorized uses of image data by allowing the addition of a specific image in a black-and-white mode even when it is set that a specific image is added in a color mode. When a document is copied, a control section determines whether the apparatus is in a color mode or a black-and-white mode. When in a black-and-white mode, an adding condition determining section reads a set security level and a differential value and determines a security level lower than the one in a color mode. Based on the security level in a black-and-white mode, an adding condition of a specific image is determined. The specific image adding section adds a specific image different from the one in a color mode based on the adding condition. A black-and-white image added with the specific image is printed.

6 Claims, 5 Drawing Sheets

IMAGE PROCESSING APPARATUS FOR ADDING DIFFERENT SPECIFIC IMAGES TO IMAGE DATA IN COLOR AND BLACK-AND-WHITE MODES

BACKGROUND OF THE INVENTION

1. Field of the Invention

The present invention relates to an image processing apparatus for restricting processing such as copying, facsimile communication, and data transmission based on a specific image contained in image data.

2. Description of the Related Art

An image processing apparatus is inputted with image data and performs processing such as outputting it by copying, facsimile transmission, or data transmission. When a specific image which indicates restriction information is detected in inputted image data, processing to be executed is restricted. This allows the prevention of unauthorized uses of the image processing apparatus thereby protecting the image data. Further, by detecting a specific image which indicates tracking information, it is made possible to identify the image processing apparatus that has outputted the image data. This will also allow the prevention of unauthorized uses.

Therefore, in an image processing apparatus, a specific image is added when inputted image data is processed. For example, it is described in Japanese Patent Laid-Open No. 2006-178048 that when image data is read in a color mode, a specific image is added to the image data; and when image data is read in a black-and-white mode, a specific image is not added.

The specific image is a color image of a light color and is not visible to a human even when it is printed. Therefore, the specific image is added in a color mode. On the other hand, a specific image is not added to image data which are processed in a black-and-white mode. However, in place of a specific image, a watermark or texture pattern is added. When a document added with a watermark or texture pattern is copied, it will be printed in such a way that such a pattern is visually recognizable. Thus, the user can recognize that that is a copy.

It is described in Japanese Patent Laid-Open No. 2001-45271 that a specific image having a color is added in the case of a color image processing apparatus for performing scanning and printing in full color, and a black-and-white specific image is added in the case of a black-and-white image processing apparatus for performing scanning and printing in monochrome.

Confidential papers of a color image are added with a specific image so that a security measure to restrict processing such as inhibiting copying is performed. However, when image data is processed in a black-and-white mode in an image processing apparatus capable of processing image data in a color mode, a specific image will not be added.

However, confidential papers include papers of a black-and-white image. Therefore, when a confidential paper of a black-and-white image is created, a specific image will not be added thereto since it is processed in a black-and-white mode. When thus created confidential paper is copied, restriction such as copying inhibition will not be applied. Thus, unauthorized uses of confidential papers can not be prevented, and therefore there is a risk that image data is leaked causing a security problem.

In view of the above described circumstance, it is an object of the present invention to provide an image processing apparatus in which the protection of image data is enhanced by configuring the apparatus such that a specific image can be added not only in a color mode, but also in a black-and-white mode.

SUMMARY OF THE INVENTION

The present invention includes a processing section for processing inputted image data, and a specific image adding section for adding a specific image to image data when the image data is processed in a color mode, in which the specific image adding section adds a specific image different from the specific image in a color mode when image data is processed in a black-and-white mode.

When a setting is made such that a specific image is added in a color mode, although a specific image is not ordinarily added in a black-and-white mode, the specific image adding section adds a specific image. This makes it possible, even when processing black-and-white image data, to perform the restriction of processing such as inhibition of copying, since a specific image is added thereto.

The specific image adding section adds a specific image depending on a security level. It is configured such that the security level in a black-and-white mode is lower than that in a color mode. That is, the level difference is fixed between the security levels in a color mode and in a black-and-white mode. Therefore, a specific image in a black-and-white mode is different from the specific image in a color mode. However, since even if the specific image is different, it can carry out the function as a specific image, the restriction of processing with respect to black-and-white image data is performed.

The specific image adding section adds a specific image in a black-and-white mode when the security level in a color mode is not lower than a predetermined level, and does not add a specific image in a black-and-white mode when the security level in a color mode is lower than a predetermined level. Since there is a level difference between the security levels of both modes, the security level in a black-and-white mode is lower than the security level in a color mode. As a result, since the security level in a black-and-white mode becomes a lower limit in some cases, a specific image will not be added.

When one of the security levels in a color mode and in a black-and-white mode is changed or set, the other of the security levels will be automatically changed or set. Since there is always a fixed level difference between the security levels of both modes, when one of the security levels is determined, the other will be automatically determined. Thus, the changings or settings of the security levels of both modes are linked to each other.

The specific image adding section adds a specific image based on an adding condition determined depending on a security level. The adding condition includes the number, the density, and the angle of specific images. A specific image is added to each page, and the number per one page is determined. Further, when the specific image is an image of inclined pattern, the angle of the inclination is determined.

When the adding condition is the number of specific images, the specific image adding section increases the number of the specific images as the security level becomes higher, and decreases the number of specific images as the security level becomes lower. When the adding condition is the density of the specific images, the specific image adding section increases the density of specific images as the security level becomes higher, and decreases the density of specific images as the security level becomes lower. When the adding condition is the angle of the specific image, the specific image adding section causes the angle to become closer to a predetermined angle as the security level becomes higher, and causes the angle to become apart from the predetermined angle as the security level becomes lower.

When a specific image is added under the adding condition determined associated with a high security level, the detection accuracy of a specific image becomes higher when detecting a specific image contained in image data. This will eliminate detection errors of a specific image making it possible to securely perform the restriction of processing based on a specific image.

According to the present invention, it is possible, when it is set such that a specific image is added in a color mode, to add a specific image when processing image data in a black-and-white mode. This will make it possible to perform the restriction of processing such as the inhibition of copying when processing confidential data of a black-and-white image, thereby preventing unauthorized uses of the confidential data.

DETAILED DESCRIPTION OF THE PREFERRED EMBODIMENTS

Figure 1:
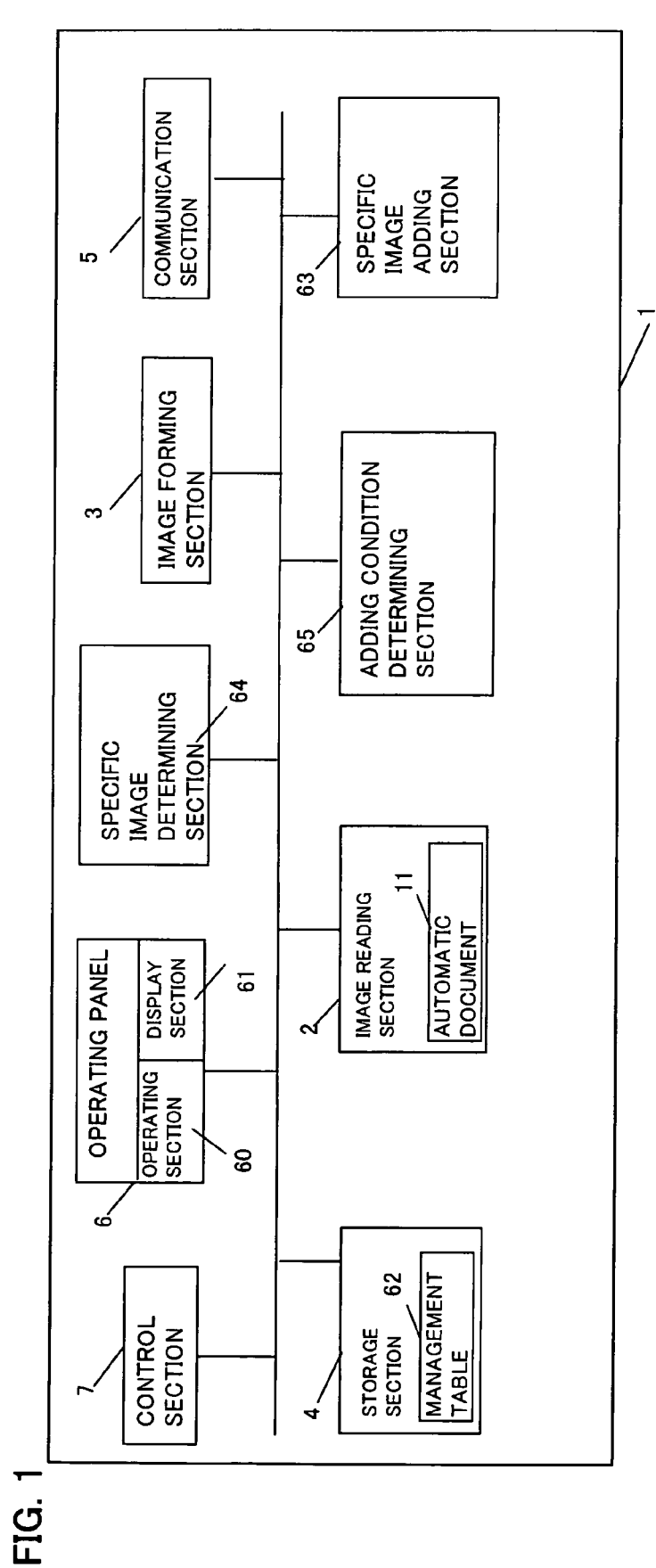
FIG. 1 is a control block diagram of an image processing apparatus of the present invention.

FIG. 1 shows an image processing apparatus of the present embodiment of the invention. The image processing apparatus, which is a complex machine for performing a copy mode, a print mode, a scanner mode, and a facsimile mode, includes in a cabinet 1, an image reading section 2 for reading a document and inputting image data, an image forming section 3 for processing the image data to print them, a storage section 4 for storing image data, a communication section 5 for communicating with external apparatuses, an operation panel 6 for input operation, and a control section 7 for controlling a processing section to perform the processing of image data depending on the mode. Moreover, the processing section is a processing section for processing the inputted image data to output them, and includes the image forming section 3, the storage section 4, and the communication section 5.

Figure 2:
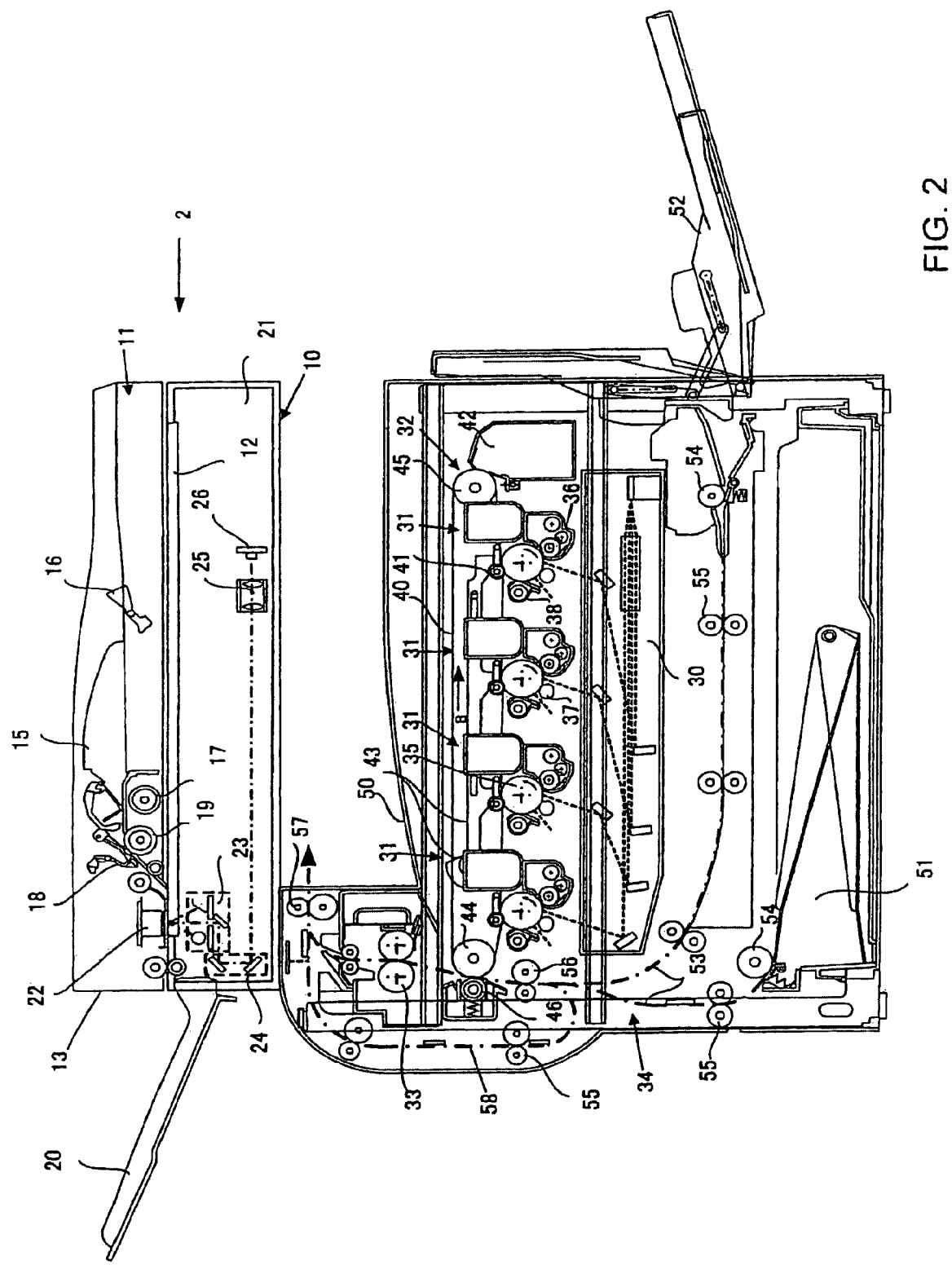
FIG. 2 schematically illustrates a general configuration of the image processing apparatus.

As shown in FIG. 2, the image reading section 2 is disposed in the upper part of the cabinet 1 and includes a scanner section 10 and an automatic document feeding section 11. The automatic document feeding section 11 is provided above the scanner section 10 and automatically feeds the document to read image data of the document.

There are provided a document table 12 made of platen glass on the top face of a cabinet 1 and a document cover 13 covering the document table 12. The automatic document feeding section 11 is integrally mounted to the document cover 13. The document cover 13 is adapted to be opened and closed, and when the document cover 13 is in a closed state, the document is fed by the automatic document feeding section 11. When the document cover 13 is in an open state, the document can be laid on the document table 12. The open and close of the document cover 13 is detected by a cover open/close sensor. Moreover, there is provided a document size detection sensor for detecting the size of the document laid on the document table 12.

When a document is set on a document set tray 15 of the automatic document feeding section 11, the document detection sensor 16 detects that a document has been set. Then, at an operation panel 6, copy conditions such as the size and the scaling ratio of the sheet to be printed are inputted. Thereafter, reading of the image of the document is started by the input operation of a start key.

At the automatic document feeding section 11, each document sheet on the document set tray 15 is withdrawn one sheet by one sheet by a pickup roller 17. The document passes through between a stacking plate 18 and a feeding roller 19 to be forwarded to the document table 12. The document is fed in a vertical scanning direction on the document table 12 to be ejected into a document discharge tray 20. There is provided in the document discharge tray 20 a document ejection sensor to detect the presence or absence of a document on the document discharge tray 20.

The scanner section 10 includes a first reading section 21 and a second reading section 22. There is formed a reading area at one side of the document table 12 so that the document passes through the reading area when it is carried on the document table 12. A first scanning unit 23 of the first reading section 21 is positioned below the reading area so that the front face (lower side surface) of the document is read.

When a document is carried to the document table 12 by the automatic document feeding section 11, the first scanning unit 23 is moved to be placed at a reading position, and the second scanning unit 24 is placed at a predetermined position as well. The front face of the document is irradiated from below the document table 12 by an exposure lamp of the first scanning unit 23. The reflected light from the document is guided to an image forming lens 25 by each reflection mirror of the first and second scanning units 23, 24. The reflected light from the document is concentrated to a CCD 26 by an image forming lens 25. An image on the front face of the document is formed on the CCD 26. Thus, the image on the front face of the document to be carried is read.

Moreover, the back face (upper side face) of the document is read by the second reading section 22. The second reading section 22 which is disposed above the document table 12 includes an exposure lamp array including a LED, a fluorescent lamp, and the like which irradiate the back face of the document, a SELFOC lens array for concentrating the reflected light from the document for each pixel, and a contact image sensor (CIS) for photoelectrically converting the reflected light from the document received through the SELFOC lens array to output analog image signals. Thus, an image on the back face of the document to be carried is read.

When a document is laid on the document table 12, the image on the front face of the document is read by the first reading section 21. The first and second scanning units 23, 24 move in the vertical scanning direction while maintaining a predetermined velocity relationship with each other. The document on the document table 12 is exposed to light by the first scanning unit 23, and the reflected light from the document is guided to the image forming lens 25 by the first and second scanning units 23, 24. The image of the document is formed on the CCD 26 by the image forming lens 25.

Thus, once the image on one side or both sides of the document has been read, the image data of the one side or both sides of the document is inputted into the control section 7. The control section 7 includes an image data processing section, and the image data is subjected to various image processing by the image data processing section. The image data is outputted to the image forming section 3.

The image forming section 3 prints a color image or a black-and-white image on a sheet based on the inputted image data. The image forming section 3 includes a laser scanning unit 30, four image stations 31, an intermediate transfer belt unit 32, fixing apparatus 33, and a feeding apparatus 34.

Each image station 31 respectively forms a color image corresponding to each color of black, cyan, magenta, and yellow. Each image station 31 includes a photoreceptor drum 35, a developing apparatus 36, a charging apparatus 37, a cleaning apparatus 38, and a neutralization apparatus (not shown).

The photoreceptor drum 35 is driven to rotate in one direction, the cleaning apparatus 38 cleans the remaining toner on the surface of the photoreceptor drum 35, and the neutralization apparatus removes electrical charges on the surface of the photoreceptor drum 35. The charging apparatus 37 causes the surface of the photoreceptor drum 35 to be electrically charged in a uniform fashion.

In the laser scanning unit 30, laser light is modulated based on the image data inputted from the image reading section and the like, and this laser light is used to repeatedly scan the surface of the photoreceptor drum 35 in the horizontal scanning direction to form an electrostatic latent image on the surface of the photoreceptor drum 35. The developing apparatus 36 provides toner to the surface of the photoreceptor drum 35, develops an electrostatic latent image, and forms a toner image on the surface of the photoreceptor drum 35.

The intermediate transfer belt unit 32 includes an intermediate transfer belt 40, an intermediate transfer roller 41, a transfer belt cleaning apparatus 42, and a tension mechanism 43. The intermediate transfer belt 40 is disposed above each photoreceptor drum 35 and is looped over a drive roller 44 and a driven roller 45 to rotate in the direction indicated by an arrow B.

The intermediate transfer roller 41 is disposed opposite to the photoreceptor drum 35 by sandwiching the intermediate transfer belt 40, and is applied with a transfer bias voltage. A voltage of the opposite polarity to that of the toner is applied by the intermediate transfer roller 41, and thereby the toner image on the surface of the photoreceptor drum 35 is transferred onto the intermediate transfer belt 40. The toner images of each color are laminated onto the intermediate transfer belt 40 to form a combined toner image of multiple colors.

The transfer roller 41 is disposed in pressurized contact with the intermediate transfer belt 40, and is applied with a voltage of the polarity opposite to that of the toner. The toner image on the intermediate transfer belt 40 is transferred by a transfer roller 46 to a sheet which has been fed between the transfer roller 46 and the intermediate transfer belt 40. The toner remaining on the intermediate transfer belt 40 is removed by the transfer belt cleaning apparatus 42.

The toner image transferred to the sheet is heated and pressurized by the fixing apparatus 33 to be fixed on the sheet so that the image is formed on the sheet. Thus, the sheet on which the image is printed is ejected into an ejection tray 50 provided on the top of the cabinet 1.

The feeding apparatus 34 feeds the sheet along a feeding path 53 from a sheet cassette 51 or a manual tray 52. The paper path 53 passes between the intermediate transfer belt 40 and the transfer roller 46, and through the fixing apparatus 33 so as to reach the ejection tray 50.

The feeding apparatus 34 includes a pickup roller 54, a feeding roller 55, a resist roller 56, and an ejection roller 57. The sheet of the sheet cassette 51 or a manual tray 52 is forwarded sheet by sheet to the feeding path 53, and fed along the paper path 53 and ejected to the ejection tray 50. While feeding this sheet, the image is printed on the sheet. Moreover, a switchback feeding path 58 is provided for double sided printing. The sheet after fixing is fed by the feeding roller 55 through the switchback feeding path 58 into between the intermediate transfer belt 40 and the transfer roller 46. The sheet both sides of which have been printed passes through the fixing apparatus 33 to be ejected onto the ejection tray 50.

The operation panel 6 is provided to the scanner section 10 and includes an operating section 60 and a display section 61. The operating section 60 includes various kinds of operating keys. The display section 61 is made up of a liquid crystal display and configured to be a touch panel. There are formed touch keys in an operating screen displayed on the display section 61, and these also function as operating keys.

Furthermore, the communication section 5 includes a communication interface, which is connected to a network such as a LAN and WAN. The network is connected to a plurality of external apparatuses. The external apparatuses include other image processing apparatuses, information processing apparatuses such as personal computers, and servers. The network is connected to the Internet from a router through a communication line such as a telephone line or optical fiber etc. The communication section 5 is configured to be able to communicate with external apparatuses through the network using a predetermined communication protocol. Further, the image processing apparatuses are also configured to be able to communicate with each other. Furthermore, the communications inside the network may be either wired or wireless. An image processing system is formed by these image processing apparatuses and external apparatuses.

The communication section 5 also includes a modem apparatus. The modem apparatus is connected with the telephone line. The image processing apparatus is capable of performing facsimile communication. Moreover, the image processing apparatus can perform data communication by Internet facsimile through the network. Furthermore, the communication section 5 includes a communication terminal and a communication card for wireless communication. The communication terminal is connected with a storage media such as a USB memory and an IC card and the communication section 5 performs data transmission/reception to and from the storage media. Moreover, data transmission by wireless communication with communication terminals such as mobile phones and PDAs is performed through a communication card.

The storage section 4 is made up of a hard disk drive. The storage section 4 stores the image data inputted from the image reading section 2 or the image data inputted from the communication section 5. Further, the inputted image data is temporarily stored in an image memory such as a DRAM, and after being subjected to image processing and encryption processing, is transferred from the image memory to the storage section 4. Moreover, when image data is read from the storage section 4, the image data is subjected to image processing and decryption processing and are stored in the image memory. Thereafter, the image data is outputted to the outside by printing, data transmission, or facsimile communication according to the processing to be executed.

The storage section 4 includes a management table 62, and the management table 62 stores information necessary for operating the image processing apparatus, such as control information, setting information, user authentication information of the image processing apparatus. When such information is created or modified, the information of the management table 62 will be updated. Further, the management table 62 may be provided in a non-volatile memory separate from the storage section 4.

The control section 7 is made up of a microcomputer including a CPU, a ROM, and a RAM, and the CPU reads a control program stored in the ROM out to the RAM to execute the control program. Thus, each section operates according to the control program.

That is, when image data is inputted from the image reading section 2 or the communication section 5 which functions as an input section, either one of a print mode, a copy mode, a scanner mode, and a facsimile mode is executed based on the processing condition contained in the input information from the operating section 60 or the header information of the image data inputted from the external apparatuses.

In the print mode, copy mode, and scanner mode, a color mode for processing a color image and a black-and-white mode for processing a black-and-white image are selectively executed. Moreover, a color image includes not only full-color images, but also mono-color and two-color images. In the copy mode and scanner mode, the color mode or the black-and-white mode is automatically selected by the control section 7 or selected by the user. In the print mode, it is selected by a printer driver installed in an information processing apparatus which gives the instruction of printing.

Further, the control program contains a browser and mailing software, and the control section 7 performs data communication with external apparatus and transmission of electronic mails through a communication protocol such as the TCP/IP protocol.

The control section 7 temporarily stores inputted image data in the storage section 4 when performing each mode. Further, the control section 7 executes a filing mode in which inputted image data is stored in the storage section 4 to be managed. The stored image data is outputted again according to the instructed processing.

The outputted image data is to be erased from the storage section 4 according to the instruction from the control section 7. At the time of such erasure, the image data is invalidated so as not to be restorable by writing random data over the image data. Thus by such invalidation processing and further by an encryption processing, unauthorized uses of the image data is prevented.

Here, in order to prevent unauthorized copying or facsimile transmission of a confidential paper, a specific image is added to the document. The specific image represents regulatory information for regulating the processes to be executed, such as copy inhibition, degradation of printing image quality, inhibition of data transmission or facsimile communication, inhibition of filing, and the like. Further, the specific image may represent tracking information for identifying the image processing apparatus which has processed image data.

The image processing apparatus includes a specific image adding section 63 for adding the specific image, a specific image determining section 64 for detecting the specific image in inputted image data, and determining if the specific image is contained, and an adding condition determining section 65 for determining the adding condition when adding a specific image.

The specific image adding section 63, of which operation is controlled by the control section 7, creates a specific image based on a determined adding condition and combines it with inputted image data. The adding conditions for specific images are stored in the management table 62. The adding condition includes the form, image forming condition, number, and position of the specific image. The control section 7 performs the processing such as the printing, data transmission, and filing of the combined image.

Figure 3:
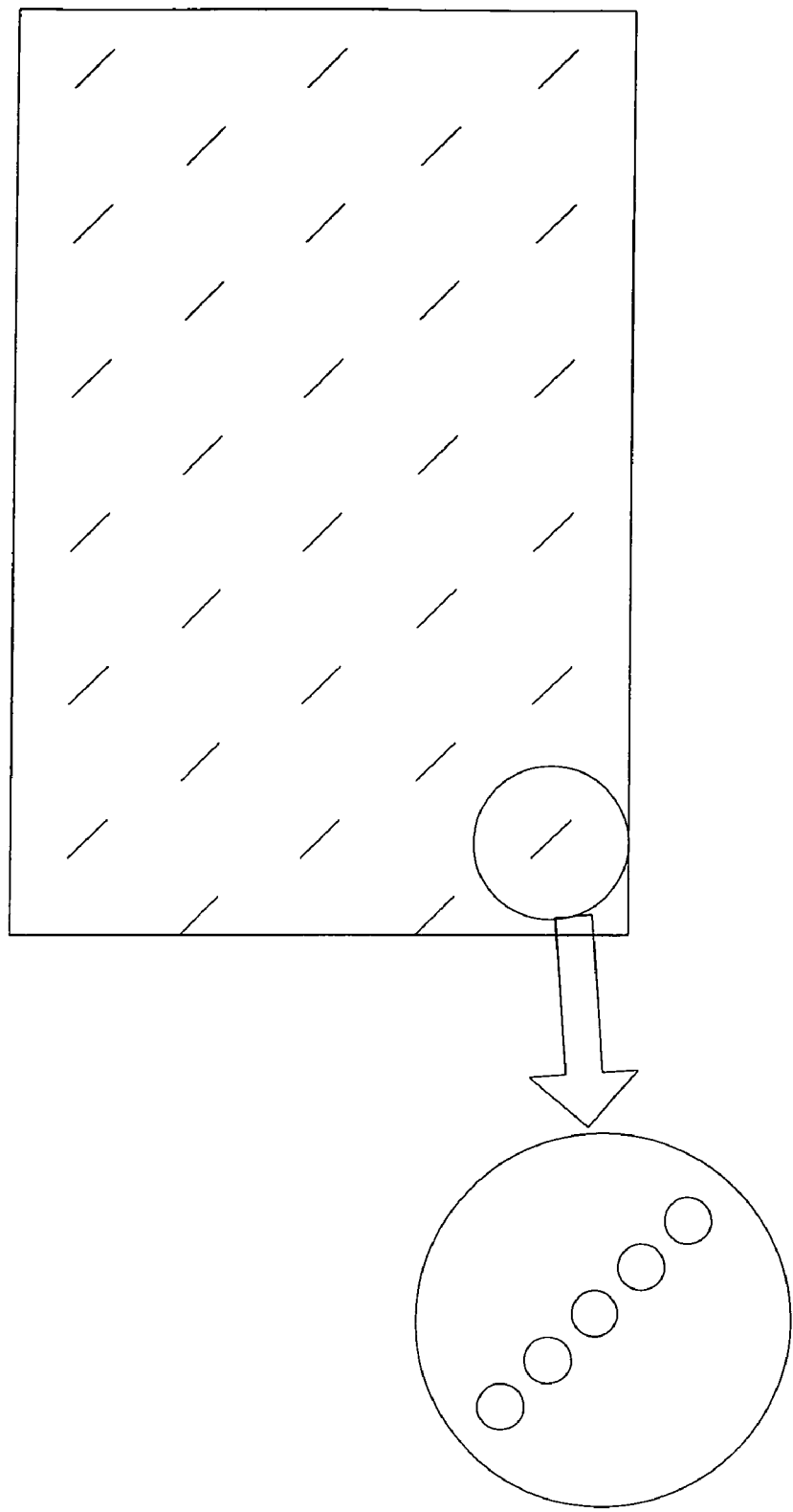
FIG. 3 shows a document in which a specific image is arranged, and an enlarged specific image.

When image data added with a specific image is printed, a document containing a specific image as shown in FIG. 3 is created. The specific image is a predetermined image, for example, in a form having an inclined pattern in which a plurality of dots are linearly aligned. Specific images of the same form are regularly disposed at a predetermined position. A plurality of specific images are contained in one page of document. Further, the number of specific images for each page is determined depending on the page size. The density of the specific image and the angle of the inclined pattern are also determined. The angle is adapted to be 45 degrees.

Moreover, image data containing a specific image is subjected to data transmission through the communication section 5. When image data is printed at an image processing apparatus which has received the image data, a document containing a specific image will be created.

The specific image of the document is hardly visible to a human. However, the specific image can be read by the image reading section 2. Then, the specific image determining section 64 functions as a detection section for detecting a specific image in inputted image data to detect any specific image contained in image data, and determines whether or not the number of the specific images exceeds a threshold. The image data is not limited to those inputted from the image reading section 2, and may be inputted from an external apparatus, or a storage medium or a communication terminal through the communication section 5.

The specific image determining section 64, of which operation is controlled by the control section 7, detects a specific image by performing a pattern matching of the inputted image data and the image data corresponding to the specific image. The image data corresponding to the specific data is registered in advance and stored in the management table 62. The specific image determining section 64 counts the number of detected specific images and determines whether or not the number of the specific images detected exceeds a threshold. When the image data is provided in the unit of a page, the number of the specific images is calculated for each page. Alternatively, the number of specific images within a predetermined regional area is calculated.

The threshold is set by an authorized user such as an administrator and stored in the management table 62. The authorized user is validated by the input of authentication information including a password, biometric information such as a finger print. The validated user can set the threshold through the operating section 60.

The control section 7 restricts the processing to be executed when specific images of more than a threshold number are contained in inputted image data. That is, the control section 7 functions as a control section to restrict the processing to be applied to the image data when detecting that a specific image is contained in the image data. When in a copy mode, inhibition of copying is instructed, and when in a facsimile mode or a scanner mode, inhibition of transmission is instructed. Further, when in a filing mode, restriction of storing image data in the storage section 4 is instructed. Moreover, the control section 7 will not restrict any processing when the number of specific images does not exceed a threshold even if they are detected.

Thus, the image processing apparatus prevents unauthorized uses of the image processing apparatus by performing the addition and detection of a specific image thereby performing security measures to protect the image data. When performing security measures, a security level is determined.

The control section 7 controls an adding condition determining section 65 such that a specific image can be added according to the determined security level. The adding condition determining section 65 determines the adding condition of specific image depending on the security level.

The security level is set by the administrator, and the contents of the setting are stored in the management table 62. In the security setting screen shown in FIG. 4, the security level is set. The security level is configured to be 10 levels from 0 to 9 with larger values indicating higher security levels.

The adding condition determining section 65 determines the number, image density, and angle of the specific image as the adding condition. Concerning the number of the specific image, it is configured such that the number of specific images for each page increases as the security level becomes higher, and the number of specific images for each page decreases as the security level becomes lower. Concerning the image density, it is configured such that the density increases as the security level becomes higher and the density decreases as the security level becomes lower. Concerning the angle of the specific image, it is configured such that the angle becomes closer to a predetermined angle, 45 degrees in this case, as the security level becomes higher and the angle becomes apart from the predetermined angle as the security level becomes lower. The adding condition includes all of the three, but it only needs to include at least one of them.

By adding specific images depending on the security level, the accuracy in detecting the specific image increases as the security level becomes higher. Therefore, since increasing the security level allows an accurate detection of the presence or absence of a specific image, it is possible to securely restrict the processing of image data containing a specific image.

On the other hand, the specific image is typically configured to be a color image of a light color so as to be inconspicuous. When a setting is made such that a specific image is to be added, a specific image can be added in a color mode, but it will not be added in a black-and-white mode. However, according to the present image processing apparatus, it is made possible to add a specific image even in a black-and-white mode.

That is, a specific image adding section 63 adds a specific image depending on the set security level in a color mode. And, in a black-and-white mode, it adds a specific image by making the security level to be lower than the set security level. Therefore, the specific image added in a color mode is different from the specific image added in a black-and-white mode.

Figure 4:
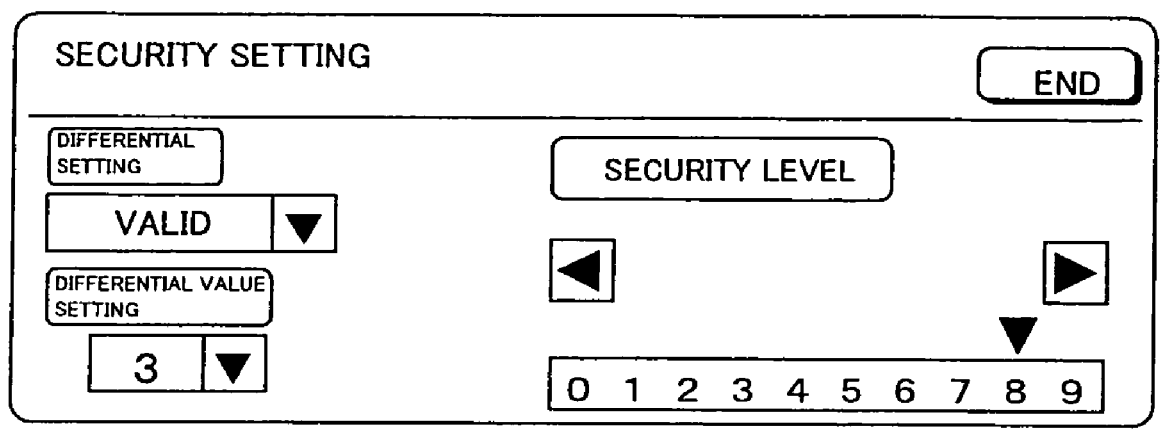
FIG. 4 shows a security setting screen.

There is a fixed level difference between the security levels in a color mode and in a black-and-white mode. An authorized user such as an administrator can set this level difference. As shown in FIG. 4, in a security setting screen, valid or invalid of the differential setting is set. When the differential setting is made valid, a desired differential value is set. For example, with the differential value being set to be 3, the security level in a black-and-white mode is automatically set to be 5 when the security level of the color mode is 8. Moreover, when the differential setting is made invalid, a specific image is not to be added in a black-and-white mode. When valid or invalid of the differential setting and the differential value are set, the control section 7 stores these differential information in the management table 62.

Thus, when the security level in a color mode is set, the security level in a black-and-white mode is automatically determined. Further, when the security level in a color mode is changed, the security level in a black-and-white mode is automatically changed accordingly. On the contrary, setting or changing the security level in a black-and-white mode will cause the security level in a color mode to be automatically set or changed. Thus, since determining one of the security levels will automatically cause the other of the security levels to be determined, it is possible to save user's time and effort thereby increasing the convenience of the user.

Then, when processing image data, the adding condition determining section 65 judges the security level depending on a color mode or a black-and-white mode, based on the differential information to determine an adding condition. The specific image adding section 63 adds a specific image based on the determined adding condition.

Figure 5:
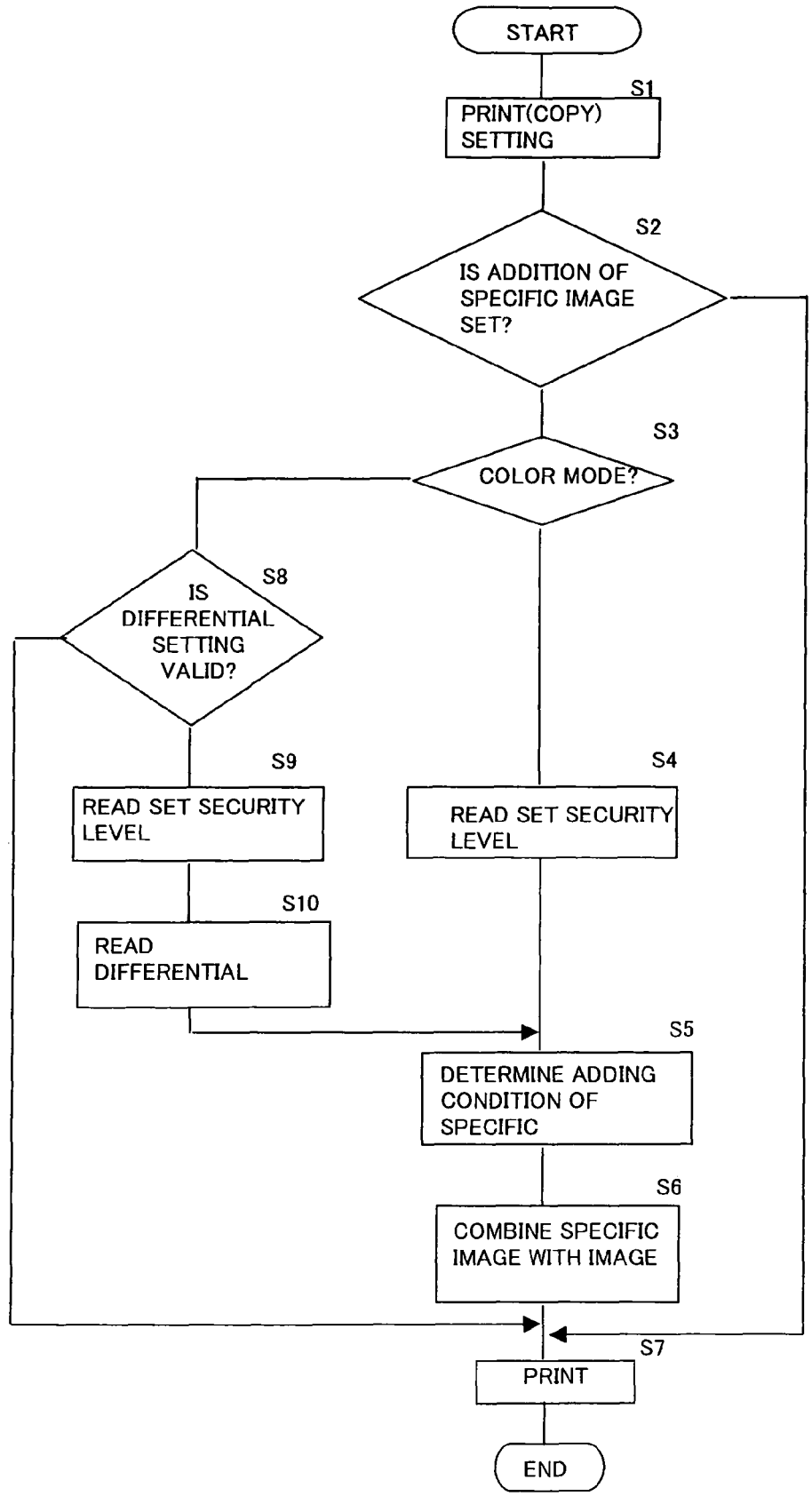
FIG. 5 is a flowchart to show the procedure when adding a specific image in a color mode or in a black-and-white mode.

This procedure for adding a specific image is shown in FIG. 5. Here, a copy mode is executed. First, the user specifies the copy condition at the operating section 60 (S1). The control section 7 confirms if the addition of a specific image is set (S2). When it is not set, the control section 7 executes copying as is and prints the image on the recording sheet (S7).

When the addition of a specific image is set, the control section 7 reads the document and determines whether it is a color image or a black-and-white image from the input image data. Moreover, referring to the specified print condition, the control section determines whether the apparatus is in a color mode or a black-and-white mode (S3). When the document is a color image, and a color or automatic determination is specified in the print condition, it is determined to be in a color mode. When the document is a color image, and a black-and-white is specified in the print condition, it is determined to be in a black-and-white mode. When the document is a black-and-white image, it is determined to be in a black-and-white mode regardless of the print condition.

When in a color mode, the adding condition determining section 65 reads a set security level from the management table 62 (S4). Then, an adding condition is determined based on the security level (S5). The specific image adding section 63 combines the specific image created based on the adding condition with the image data (S6). Thus, a color image added with a specific image is printed (S7).

When in a black-and-white mode, the control section 7 confirms the differential setting (S8) When the differential setting is invalid, a specific image is not added. Therefore, a black-and-white image is printed (S7). When the differential setting is valid, a specific image is added. The adding condition determining section 65 reads the security level from the management table 62 (S9) and reads a differential value (S10). Then, it calculates the security level in a black-and-white mode and an adding condition is determined based on the security level (S5). The specific image adding section 63 combines a specific image created based on the adding condition with image data (S6). Thus, a black-and-white image added with a specific image is printed (S7).

Moreover, the specific image in a black-and-white mode is a color image as with the specific image in a color mode. However, the specific image in a black-and-white mode has a lower security level than that of the specific image in a color mode. For example, the number is smaller, the density is lower, or the difference of angle with respect to a predetermined angle is larger. That is, the specific image in a black-and-white mode is a different specific image from the one in a color mode.

Further, when in a print mode, image data of a black-and-white image is inputted into the image processing apparatus from an information processing apparatus. At this time, even if the information processing apparatus does not instruct the addition of a specific image, the image processing apparatus adds a specific image as described above to print the image data. The processing of image data is not limited to printing, but filing of the image data added with a specific image and data transmission of them are also possible.

Thus, when it is set that a specific image is to be added in a color mode, a specific image is added even when the processing of image data is a black-and-white mode. That is, a color mode is executed to add a specific image. Therefore, when creating a confidential paper of a black-and-white image, a specific image can be automatically added. Thus, it is possible to prevent unauthorized uses of confidential papers of a black-and-white image thereby enhancing the protection of image data.

Furthermore, the user needs not to perform the operation of changing the setting to add a specific image each time processing image data in a black-and-white mode. Therefore, it is possible to mitigate the burden on the user regarding the security measures.

The present invention will not be limited to the above described embodiments and many modifications and alterations can certainly be made to the above described embodiments within the scope of the present invention. Although the security level of a black-and-white mode is determined by the security level and differential value in a color mode, when the security level in a color mode is set at a level equal to the differential value, the security level in a black-and-white mode becomes zero. In this case, even if the differential setting is valid, a specific image will not be added. Therefore, the setting as described above may be made when a specific image needs to be added in a color mode, but a specific image needs not be added in a black-and-white mode.

The specific image to be added in a black-and-white mode may be a black-and-white image, so as to be different from the specific image in a color mode. In this case, there is no need of creating a color image for the specific image in a black-and-white mode, and thus the processing time will not be increased. Moreover, the specific image in a black-and-white mode may be differentiated from the specific image in a color mode by changing its form. For example, the size of the specific image itself may be decreased in a black-and-white mode. That is, the larger the specific image is, the higher the security level becomes.

What is claimed is:

1. An image processing apparatus, comprising:
    a processing section for processing inputted image data; and
    a specific image adding section for adding a specific image to the image data depending on a security level when processing the image data in a color mode, wherein
    the specific image adding section adds a specific image different from the specific image for the color mode when the image data is processed in a black-and-white mode, a security level in the black-and-white mode being lower than the security level in the color mode based on a fixed level difference between the security levels of the color mode and the black-and-white mode, and
    the specific image adding section adds the specific image in the black-and-white mode when the security level in the color mode is not lower than a predetermined level, and does not add the specific image in the black-and-white mode when the security level in the color mode is lower than the predetermined level.

2. The image processing apparatus according to claim 1, wherein:
    when one of the security levels in the color mode and in the black-and-white mode is changed or set, the other of the security levels is automatically changed or set.

3. The image processing apparatus according to claim 1, wherein:
    the specific image adding section adds the specific image based on an adding condition determined depending on a security level.

4. The image processing apparatus according to claim 3, wherein:
    the adding condition is the number of the specific images; and
    the specific image adding section increases the number of the specific images as the security level becomes higher, and decreases the number of the specific images as the security level becomes lower.

5. The image processing apparatus according to claim 3, wherein:
    the adding condition is the density of the specific image; and
    the specific image adding section increases the density as the security level becomes higher and decreases the density as the security level becomes lower.

6. The image processing apparatus according to claim 3, wherein:
    the adding condition is an angle of the specific image; and
    the specific image adding section causes the angle to become closer to a predetermined angle as the security level becomes higher, and causes the angle to become apart from the predetermined angle as the security level becomes lower.

* * * * *